United States Patent
Ewing

(10) Patent No.: US 9,298,954 B1
(45) Date of Patent: Mar. 29, 2016

(54) TAG SECURITY SYSTEMS AND METHODS FOR ARTICLES OF MERCHANDISE

(75) Inventor: David B. Ewing, Madison, AL (US)

(73) Assignee: SYNAPSE WIRELESS, INC., Huntsville, AL (US)

( * ) Notice: Subject to any disclaimer, the term of this patent is extended or adjusted under 35 U.S.C. 154(b) by 275 days.

(21) Appl. No.: 13/019,840

(22) Filed: Feb. 2, 2011

Related U.S. Application Data

(60) Provisional application No. 61/301,093, filed on Feb. 3, 2010.

(51) Int. Cl.
| | |
|---|---|
| G08B 13/14 | (2006.01) |
| G06K 7/00 | (2006.01) |
| G06K 19/07 | (2006.01) |
| G06Q 10/08 | (2012.01) |
| G06K 19/077 | (2006.01) |

(52) U.S. Cl.
CPC .......... *G06K 7/0008* (2013.01); *G06K 19/0723* (2013.01); *G06K 19/07749* (2013.01); *G06Q 10/08* (2013.01); *G06Q 10/087* (2013.01)

(58) Field of Classification Search
CPC .. G06K 7/0008; G06K 19/0723; G06Q 10/08
USPC ............................ 340/572.1–572.9, 10.1–10.6
See application file for complete search history.

(56) References Cited

U.S. PATENT DOCUMENTS

| | | | |
|---|---|---|---|
| 4,751,500 A | 6/1988 | Minasy et al. | |
| 4,962,369 A | 10/1990 | Close | |
| 5,151,684 A | 9/1992 | Johnsen | |
| 5,739,514 A | 4/1998 | Uchida | |
| 6,043,746 A | 3/2000 | Sorrells | |
| 6,535,716 B1 * | 3/2003 | Reichman | H04B 7/18586 370/345 |
| 7,564,360 B2 | 7/2009 | Cote et al. | |
| 7,817,041 B2 | 10/2010 | Skjellerup et al. | |
| 7,844,505 B1 * | 11/2010 | Arneson | G06Q 10/087 340/10.2 |
| 2005/0150952 A1 * | 7/2005 | Chung | H04L 63/12 235/385 |
| 2006/0022815 A1 * | 2/2006 | Fischer | G06K 7/0008 340/505 |
| 2008/0249899 A1 * | 10/2008 | Nasser | G06Q 10/087 705/28 |
| 2008/0291023 A1 * | 11/2008 | Anderson | G06Q 10/087 340/572.1 |
| 2011/0068906 A1 * | 3/2011 | Shafer | G06K 7/0008 340/10.3 |

* cited by examiner

*Primary Examiner* — George Bugg
*Assistant Examiner* — Anthony D Afrifa-Kyei
(74) *Attorney, Agent, or Firm* — Maynard Cooper & Gale, P.C.; Jon E. Holland

(57) ABSTRACT

A tag security system has a plurality of hubs positioned within a store. A security tag is attached to an article of merchandise and tracked, via the hubs, to determine when the security tag is moved to a predefined area, such as close to a store exit. An alarm is provided when the security tag is determined to be within the predefined area. In addition to providing merchandise security, the security tag is used for other purposes, such as taking inventory and marketing analysis. As an example, during a store-wide inventory, the approximate location of the article of merchandise may be determined via wireless communication with the security tag. Also, the security tag may be used to sense when consumers are handling the article of merchandise thereby providing marketing information indicative of consumer interest in such article. Further, unlocking of the security tag from the article of merchandise may be automatically controlled based on a message confirming that the article has been purchased thereby frustrating attempts to defeat the security provided by the system.

25 Claims, 7 Drawing Sheets

TAG SECURITY SYSTEMS AND METHODS FOR ARTICLES OF MERCHANDISE

CROSS REFERENCE TO RELATED APPLICATION

This application claims priority to U.S. Provisional Patent Application No. 61/301,093, entitled "Tag Security Systems and Methods for Articles of Merchandise" and filed on Feb. 3, 2010, which is incorporated herein by reference.

RELATED ART

In retail stores, such as department stores and the like, electronic security tags have been used to protect articles of merchandise from theft. In this regard, electronic security tags are detachably coupled to articles of merchandise within a retail store, such as expensive clothing, electronics, or other high-end goods, and a wireless communication apparatus, referred to herein as a "radio frequency (RF) gate device," is positioned at an exit of the store. The RF gate device and each security tag within range of the RF gate device communicate wirelessly via RF signals. By measuring the signal strength of a signal from the security tag, the RF gate device can estimate the range between the RF gate device and the security tag. If the security tag comes within a specified range of the RF gate device (e.g., comes close to the RF gate device indicating that a person may be carrying the article of merchandise out of the store exit), the RF gate device triggers an alarm, such as audible beeps. Such systems help to deter and prevent theft of articles within the store.

However, current tag security systems suffer from various drawbacks and limitations that adversely affect their performance. In this regard, the security tags typically have a mechanical locking mechanism that secures a security tag to an article of merchandise. The locking mechanism can be actuated by a store employee at the time of purchase in order to remove a security tag from an article of merchandise being purchased. In some instances, a thief is able to actuate the locking mechanism in order to remove a security tag from an article of merchandise without actually purchasing the article. Further, the security tags are vulnerable to being removed by an unscrupulous employee who is participating in the theft of the security tag.

In addition, thieves have been known to disable wireless communication between a security tag and the RF gate device so that the article of merchandise coupled to the security tag can be removed from the store without triggering an alarm. For example, some thieves have wrapped a security tag in a material, such as aluminum foil, that interferes with the communication between the security tag and the RF gate device before removing an article of merchandise from the store. Various other techniques have been used to defeat the security measures provided by current tag security systems.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to security tag systems and methods for articles of merchandise, such as clothes, electronics, sporting goods (e.g., bats, gloves, etc.), or other types of consumer goods. In one exemplary embodiment, a tag security system has a server, a plurality of system hubs, at least one gate hub, and at least one electronic security tag. The security tag is detachably coupled to an article of merchandise and is configured to communicate wireless signals, such as radio frequency (RF) signals, with the system hubs and the gate hub. Further, the gate hub is positioned close to an exit of a building, such as a retail store, or other venue at which articles of merchandise are being sold or displayed to consumers or the public. In addition, the system hubs are positioned at various locations around the building or other venue.

Based on signals from the hubs, the security tag estimates its approximate location within a building or other venue, and the security tag collects various marketing data, such as how often or when the article of merchandise coupled to it is handled by customers. From time-to-time, the security tag communicates with the server via the hubs to provide the server with the marketing data and the tag's estimated location. The server stores such information to allow the information to be later accessed as may be desired, such as taking an inventory of the articles of merchandise or analyzing the marketing data. Further, if a security tag comes within a specified range of the gate hub, an alarm is triggered to provide notice and/or deterrence of a possible theft.

Figure 1:
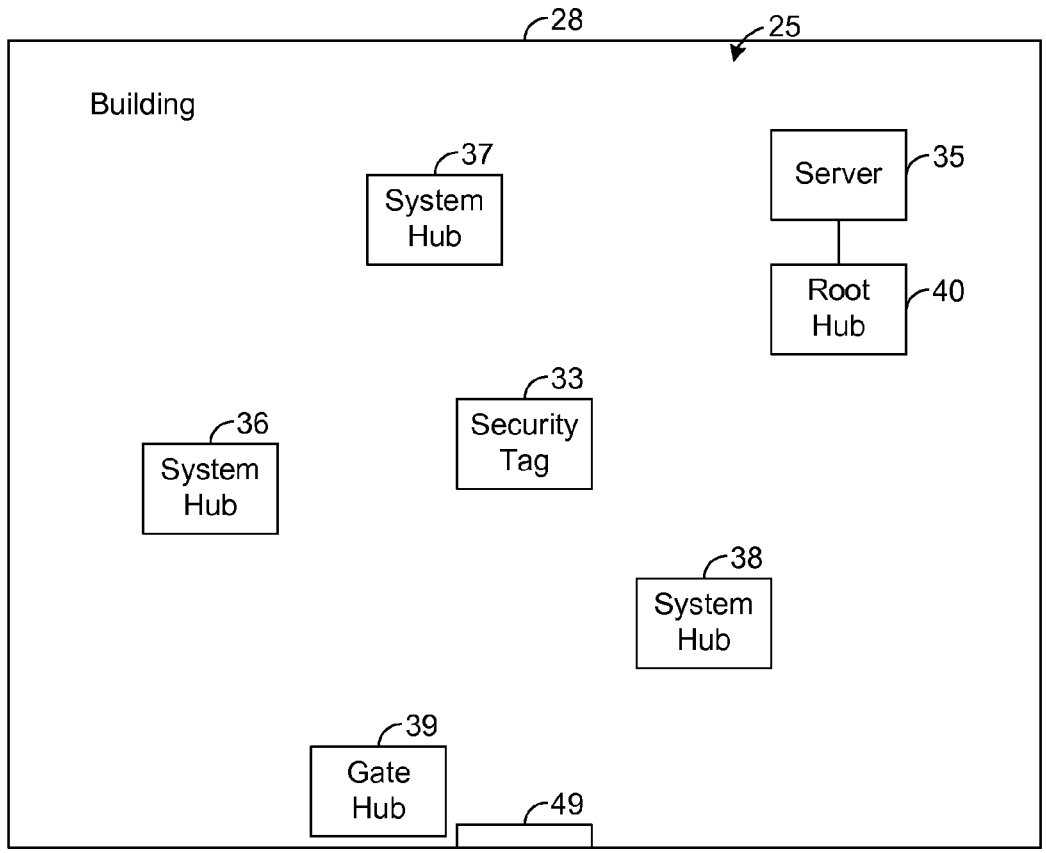
FIG. 1 is a block diagram illustrating an exemplary embodiment of a tag security system in accordance with the present disclosure.

FIG. 1 depicts an exemplary embodiment of a security tag system 25 implemented within a building 28, such as a retail store. In other embodiments, the system 25 can be implemented at other venues, such as outdoor markets, multi-building venues, etc. The system 25 comprises an electronic security tag 33, a server 35, at least one system hub 36-38, at least one gate hub 39, and at least one root hub 40. In other embodiments, any number of security tags 33, servers 35, system hubs 36-38, gate hubs 39, and/or root hubs 40 may be used.

The security tag 33 is configured to communicate wireless signals, such as radio frequency (RF) signals, with the hubs 36-40. Further, the hubs 36-40 are configured to communicate with the server 35. In one exemplary embodiment, the hubs 36-40 form an ad hoc wireless network, and the root hub 40 serves as gateway to such network for the server 35. However, other types of networks and communication techniques are possible in other embodiments.

Figure 2:
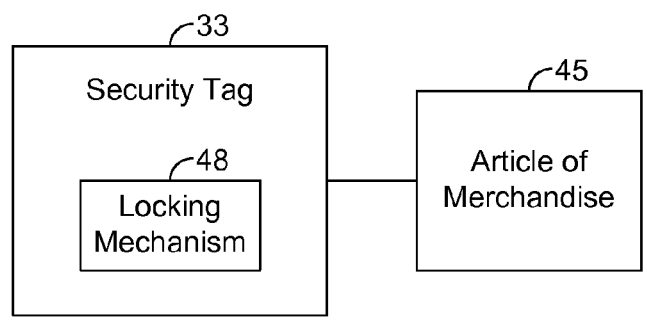
FIG. 2 is a block diagram illustrating an exemplary embodiment of a security tag, such as is depicted by FIG. 1, coupled to an article of merchandise.

As shown by FIG. 2, the security tag 33 is detachably coupled to an article of merchandise 45, such as a clothing item, an electronic apparatus, a sporting good, or other type of consumer good. In this regard, the security tag 33 has a locking mechanism 48 that couples the security tag 33 to the article 45. As will be described in more detail hereafter, the locking mechanism 48 is controlled by electronic signaling to selectively lock the security tag 33 to the article 45 and unlock the security tag 33 from the article 45 as may be desired. For example, the locking mechanism 48 may be configured to lock the security tag 33 to the article 45 and then unlock the security tag 33 at the time of purchase of the article 45.

Referring to FIG. 1, the hubs 36-40 are positioned such that the security tag 33 is within range of at least one hub 36-40 regardless of its location within the building 28. The gate hub 39 is positioned such that the range of the gate hub 39 extends into an area in which the presence of a security tag 33 indicates that an alarm is to be triggered. As an example, the gate hub 39 may be positioned close to an exit 49 of the building 28 so that the tag 33 is within range of the gate hub 39 as it is leaving the store 28 or just before it leaves the store 28 through the exit 49. In such an example, the gate hub 39 may cause an alarm to be triggered as the security tag 33 is exiting or just before it exits the store 28 thereby providing notice of and/or deterrence to a thief who is trying to steal the article 45 coupled to the security tag 33.

Figure 3:
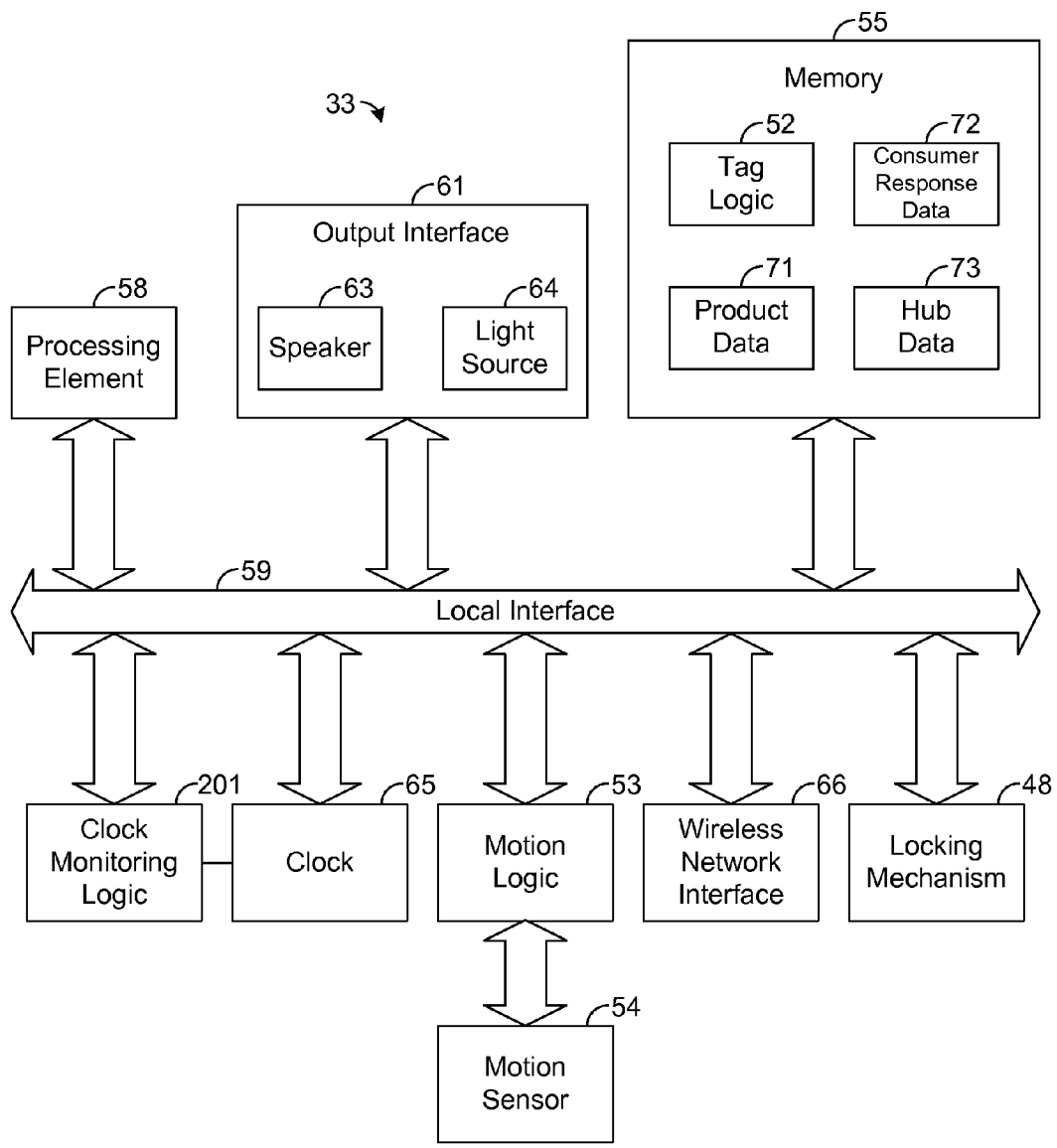
FIG. 3 is a block diagram illustrating an exemplary embodiment of a security tag, such as is depicted by FIG. 1.

FIG. 3 depicts an exemplary embodiment of the security tag 33. As shown by FIG. 3, the security tag 33 comprises tag logic 52 for generally controlling the operation of the security tag 33. The security tag 33 also comprises motion logic 53, which is used to control the tag 33 based on a motion sensor 54, as will be described in more detail hereafter. The tag logic 52 and the motion logic 53 can be implemented in software, hardware, firmware, or any combination thereof. In the exemplary embodiment illustrated in FIG. 3, the tag logic 52 is implemented in software and stored in memory 55. Further, the motion logic 53 is implemented in hardware, but other configurations of the tag logic 52 and the motion logic 53 are possible in other embodiments.

Note that the tag logic 52 and/or the motion logic 53, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the security tag 33 depicted by FIG. 3 comprises at least one conventional processing element 58, such as a digital signal processor (DSP) or a central processing unit (CPU), that communicates to and drives the other elements within the security tag 33 via a local interface 59, which can include at least one bus. The security tag 33 also comprises an output interface 61 that allows the security tag 33 to provide an output to a user. For example, in one exemplary embodiment, the output interface 61 comprises a speaker 63 and a light source 64. The speaker 63 is configured to output sound, such as an audible alarm, and the light source 64, such as a light emitting diode (LED), is configured to emit light (e.g., a visual alarm). The security tag 33 also has a clock 65, which will be described in more detail hereafter.

The security tag 33 further comprises a wireless network interface 66 for enabling the tag 33 to communicate with hubs 36-40 and/or the server 35 via wireless signals. In one exemplary embodiment, the network interface 66 communicates RF signals but other types of signals may be communicated in other embodiments. Exemplary techniques for communicating in a wireless network are described in U.S. patent application Ser. No. 12/463,073, entitled "Systems and Methods for Wirelessly Communicating Multidrop Packets via Wireless Networks," and filed on May 8, 2009, which is incorporated herein by reference.

As shown by FIG. 3 the locking mechanism 48 is coupled to the local interface 59 allowing communication between the tag logic 52 and the locking mechanism 48. As will be described in more detail hereafter, the tag logic 52 transmits to the locking mechanism 48 control signals for selectively locking and unlocking the locking mechanism 48 to and from the article 45. Various types of known and future-developed locking mechanisms 48 may be used to secure the security tag 33 to the article 45.

As further shown by FIG. 3, product data 71, consumer response data 72, and hub data 73 are stored in the memory 55 of the security tag 33. The product data 71 includes information identifying and indicating the type of article 45 to which the security tag 33 is secured. As an example, the product data 71 may include the stock-keeping unit (SKU) code of the article 45, and the product data 71 may also include a physical description of the article 45. As an example, the product data 71 may indicate the name or type of the article 45. The product data 71 may include the name of a manufacturer of the article 45. The product data 71 may also include a date associated with the article 45, such as the date that the article 45 was shipped to or received by a retailer or the date that manufacture of the article 45 was completed. Various other information about the article 45 may be included in the product data 71.

The consumer response data 72 includes information indicative of how consumers handle or otherwise respond to the article 45. For example, in one exemplary embodiment, the motion logic 53, based on the motion sensor 54, determines when the article 45 is being handled (e.g., picked-up or otherwise moved by a consumer or other user). The motion logic 53 notifies the tag logic 52 each time the motion logic 53 detects a handling event. A handling event occurs when the motion sensed by the motion sensor 54 is deemed significant enough such that it is likely that the article 45 is being moved by a user, such as a consumer. In one exemplary embodiment, the motion logic 53 detects a handling event when the motion sensed by the motion sensor 54 exceeds a threshold. The consumer response data 72 includes a value, referred to as a "handling count," indicating the number of handling events detected by the motion logic 54. Upon the occurrence of each handling event, the tag logic 52 increments the handling count.

Once a handling event is detected and the handling count is updated, the motion logic 53 waits a specified amount of time before updating the handling count again. For example, the motion logic 53 may wait a predetermined amount of time after detection of a handling event or a detection that the motion sensed by the motion sensor 54 has fallen below a threshold before responding to the motion sensor 54 for the purpose of updating the handling count. Such waiting helps to prevent the motion logic 53 from updating the handling count multiple times for the same touching by a consumer so that the handling count likely indicates the approximate number of different consumers who handled the article 45. Such information may be useful to assist in marketing the article 45 or assessing the marketability of the article 45. For example, the handling count may be used to help determine how appealing the article 45 is to consumers and/or to help areas in the store that are optimal for generating consumer interest in the article 45.

Various types of motion sensors 54 may be used to sense movement of the article 45. In one exemplary embodiment, the motion sensor 54 comprises an omni-directional tilt and vibration (ODTV) sensor 77. Such a sensor has a small metallic bead that moves due to tilts and vibrations of the sensor. Movement of the bead causes the ODTV sensor to switch between open and closed states. Current is allowed to flow through the ODTV sensor in the closed state, and current is prevented from flowing through the ODTV sensor in the open state. The number of times that the ODTV sensor switches state is directly proportional to the movement sensed by the ODTV sensor. The motion logic 53 counts the number of times that the ODTV sensor switches states and utilizes a "leaky bucket" algorithm to detect an occurrence of a handling event. In this regard, the motion logic 53 increases the count each time the ODTV sensor switches state and decrements the count at a certain frequency. If the count exceeds a specified threshold, then the motion logic 53 detects an occurrence of a handling event. In one exemplary embodiment, the motion logic 53 waits a predefined time period before detecting the next occurrence of a handling event. Thus, once a handling event is detected, the motion logic 53 waits a predefined time period before enabling detection of the next handling event regardless of the count's value during the predefined time period. Alternatively or in addition to such a wait period, the motion logic 53 may reset the handling count in response a detection of a handling event. It should be noted that various other types of motion sensors and other techniques for detecting handling events may be used in other embodiments of the present disclosure. In addition, the consumer response data 72 may indicate other types of information pertaining to consumer responses to the article 45 that is coupled to the security tag 33.

The hub data 73 includes information indicative of the hub 36-40 that is selected by the tag logic 52 for communication. In this regard, as will be described in more detail below, the security tag 33 receives wireless signals from hubs 36-40 that are within range of the security tag 33. The tag logic 52 measures and compares the signal strengths of the received hub signals to identify which hub 36-40 transmitted the highest strength signal received by the security tag 33. In general, the highest strength received signal will likely be from the hub 36-40 that is the closest to the security tag 33 assuming that each hub 36-40 is transmitting at about the same power level. The tag logic 52 then selects the hub 36-40 from which the highest strength hub signal was received for communication. The hub 36-40 currently selected by the tag logic 52 for communication shall be referred to hereafter as the tag's "primary hub."

Note that the hub 35-39 selected as the primary hub by the tag logic 52 can change from time-to-time as the security tag 33 is moved throughout the building 28. In this regard, if the signal strength of the signals from the tag's primary hub falls below a specified threshold, the tag logic 52 searches for a new primary hub. In this regard, the tag logic 52 listens for hub signals from each hub 36-40 within range of the security tag 33 and repeats the aforementioned primary hub selection process of measuring and comparing signal strengths. Thus, as the security tag 33 is moved throughout the building 28, reliable communication between the security tag 33 and the hubs 36-40 is maintained.

Notably, the hub 36-40 selected by the security tag 33 as its current primary hub is indicative of the security tag's approximate location. In this regard, each hub 36 is associated with a particular area, referred to hereafter as "coverage area," of the building 28. In particular, a hub's associated coverage area is the area in which the signal strength of the signals transmitted from the hub are greater than the signal strengths of the signals transmitted by all of the other hubs. Thus, if a security tag 33 selects a particular hub 36-40 as its primary hub, then it is known that the security tag 33 is likely within the hub's associated coverage area.

Figure 4:
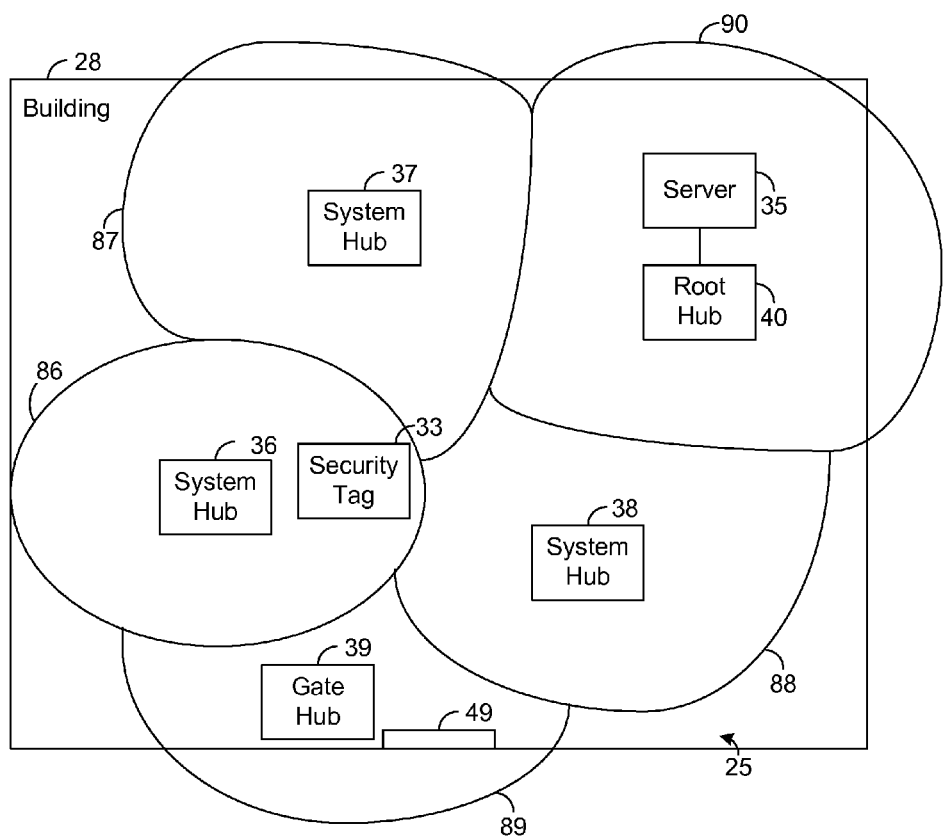
FIG. 4 is a block diagram illustrating an exemplary embodiment of a tag security system in accordance with the present disclosure.

To better illustrate the foregoing, refer to FIG. 4, which depicts exemplary coverage areas for the hubs 36-40. The hubs 36-40 are associated with the coverage areas 86-90, respectively. Thus, the hub 36 is associated with the coverage area 86, and the hub 37 is associated with the coverage area 87. Further, the hub 38 is associated with the coverage area 88, and the gate hub 39 is associated with the coverage area 89. In addition, the root hub 40 is associated with the coverage area 90. Accordingly, if the security tag 33 is within the coverage area 86 associated with the hub 36, then it is likely that the security tag 33 will select the hub 36 as its primary hub. Thus, based on such selection, it can be determined that the tag 33 is likely within the hub's associated coverage area 86.

In one exemplary embodiment, signals transmitted from the tag's primary hub include a hub identifier that identifies the transmitting hub. The tag 33 stores the hub identifier of its primary hub in the hub data 73. Since each hub is correlated with a respective coverage area, the hub identifier stored in the hub data 73 is indicative of the tag's current location.

If desired, the tag's location may be indicated by data in addition to or in lieu of the hub identifiers of the tag's primary hub. For example, a security tag 33 may receive wireless signals from one or more hubs 36-40 or other devices and calculate one or more location coordinates indicative of the tag's location. For example, triangulation or trilateration algorithms may be used to calculate the tag's positioning. Various other types of techniques for determining the tag's position may be employed. The hub data 73 may include any type of location value indicative of the tag's location.

Figure 5:
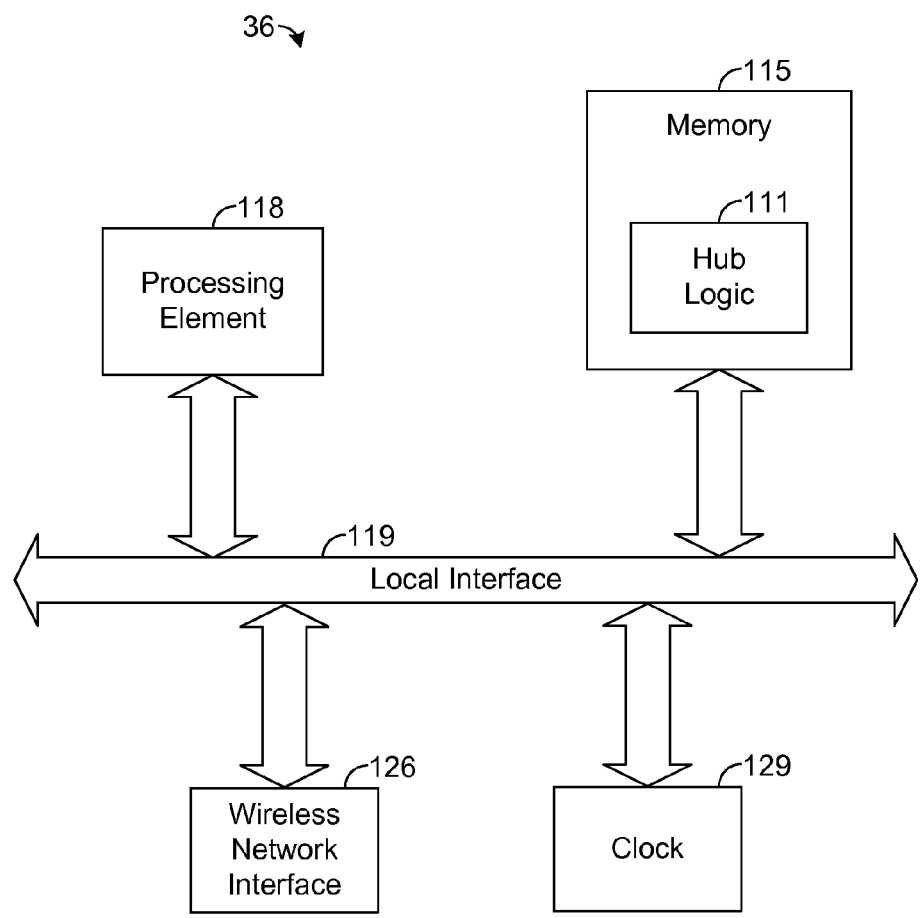
FIG. 5 is a block diagram illustrating an exemplary embodiment of a system hub, such as is depicted by FIG. 4.

FIG. 5 depicts an exemplary embodiment of the system hub 36. Each of the other system hubs 37 and 38 may be configured similar or identical to the exemplary embodiment shown by FIG. 5. As shown by the FIG. 5, the hub 36 comprises hub logic 111 for generally controlling the operation of the hub 36. The hub logic 111 can be implemented in software, hardware, firmware, or any combination thereof. In the exemplary embodiment illustrated in FIG. 5, the hub logic 111 is implemented in software and stored in memory 115. The hub logic 111, when implemented in software, can be stored and transported on any computer-readable medium for use by or in connection with an instruction execution apparatus that can fetch and execute instructions.

The exemplary embodiment of the system hub 36 depicted by FIG. 5 comprises at least one conventional processing element 118, such as a digital signal processor (DSP) or a central processing unit (CPU), that communicates to and drives the other elements within the hub 36 via a local interface 119, which can include at least one bus. The hub 36 also comprises a wireless network interface 126 for enabling the hub 36 to communicate with security tags 33, other hubs 37-40, and/or the server 35. In one exemplary embodiment, the network interface 126 communicates RF signals but other types of signals may be communicated in other embodiments.

As will be described in more detail hereafter, the security tag 33, hubs 36-40 and server 35 form an ad hoc wireless network that can be used by the security tag 33 to communicate information between the security tag 33 and the server 35. In this regard, the hubs 36-40 are used as routing nodes to route messages between any security tag 33 and the server 35. Such a message can hop through any number of hubs 36-40 before reaching its destination (e.g., the server 35 or the tag 33). In other embodiments, other types of networks and other techniques for communicating are possible.

As shown by FIG. 5, the hub 36 further comprises a clock 129. In one exemplary embodiment, the clock 129 is synchronized with the clocks of the other hubs 37-40 of the system 25. In this regard, the server 35 from time-to-time broadcasts a synchronization message that is received by each hub 36-40. The synchronization signal is indicative of a time of a clock 132 (FIG. 8) of the server 35 at the time of transmission from the server 35. Each of the hubs 36-40, based on the synchronization message, updates its clock so that the clocks used by the hubs 36-40 are synchronized to the clock 132 of the server 35. In other embodiments, other techniques for synchronizing the clocks of the hubs 36-40 are possible.

In one exemplary embodiment, the hubs 36-40 communicate wirelessly at the same frequency and are allocated time periods in which to communicate with the security tags 33. A time period allocated to a hub 36-40 for communication with the tags 33 shall be referred to herein as the hub's "tag communication period." In one exemplary embodiment, the tag communication periods for each hub 36-40 are predefined. For example, the hubs 36-40 may be configured such that the tag communication periods for each hub are periodic. As a mere example, each tag communication period is 100 milliseconds (ms) in one exemplary embodiment, and the tag communication period for a given hub 36-40 does not overlap with a tag communication period of any of the other hubs 36-40 thereby helping to avoid data collisions. That is, the communication between the hubs 36-40 and the security tags 33 are time-division multiplexed on a per hub basis. In addition, the tag communication periods for the same hub 36-40 occur periodically (e.g., every 5 seconds). For example, the hub 36 is allocated a tag communication period that is 100 ms in duration every 5 seconds. During such tag communication period for the hub 36, the other hubs 37-40 do not attempt to communicate at the same frequency. In other embodiments, other techniques for communicating between the security tags 33 and hubs 36-40 are possible.

Figure 6:
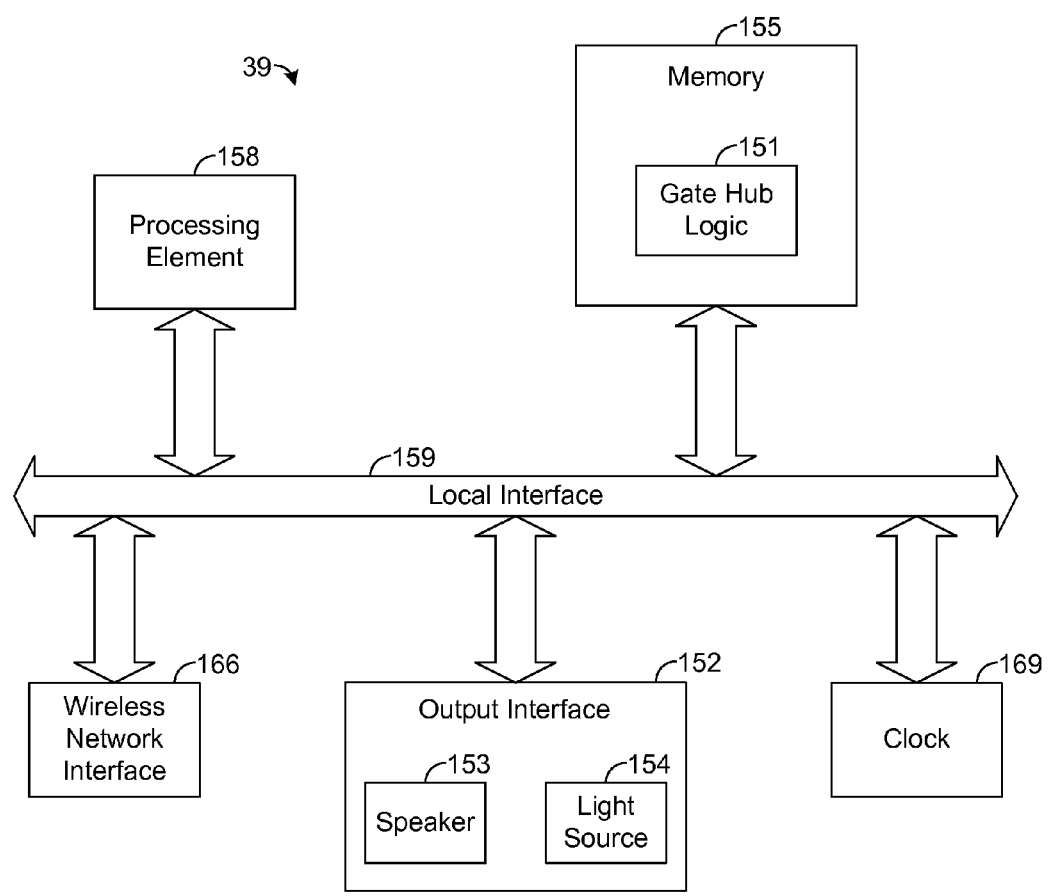
FIG. 6 is a block diagram illustrating an exemplary embodiment of a gate hub, such as is depicted by FIG. 4.

FIG. 6 depicts an exemplary embodiment of the gate hub 39. The architecture of the gate hub 39 is similar to that of the other system hubs 36-38 except that the gate hub 39 has an output interface 152 for providing alarms, as will be described in more detail hereafter. In one exemplary embodiment, the output interface 152 comprises a speaker 153 for emitting audible alarms and a light source 154 for emitting visual alarms.

As shown by FIG. 6, the gate hub 39 has gate hub logic 151 for generally controlling the operation of the gate hub 39. The gate hub logic 151 can be implemented in software, hardware, firmware, or any combination thereof. In the exemplary embodiment illustrated in FIG. 6, the gate hub logic 151 is implemented in software and stored in memory 155. The gate hub logic 151, when implemented in software, can be stored and transported on any computer-readable medium for use by or in connection with an instruction execution apparatus that can fetch and execute instructions.

The exemplary embodiment of the gate hub 39 depicted by FIG. 6 comprises at least one conventional processing element 158, such as a digital signal processor (DSP) or a central processing unit (CPU), that communicates to and drives the other elements within the hub 39 via a local interface 159, which can include at least one bus. The gate hub 39 also comprises a wireless network interface 166 for enabling the gate hub 39 to communicate with security tags 33, other hubs 36-38 and 40, and/or the server 35. In one exemplary embodiment, the network interface 166 communicates RF signals but other types of signals may be communicated in other embodiments. The gate hub 39 further comprises a clock 169. As described above, the clock 169 is synchronized with the clocks of the other hubs 36-38 of the system 25.

Figure 7:
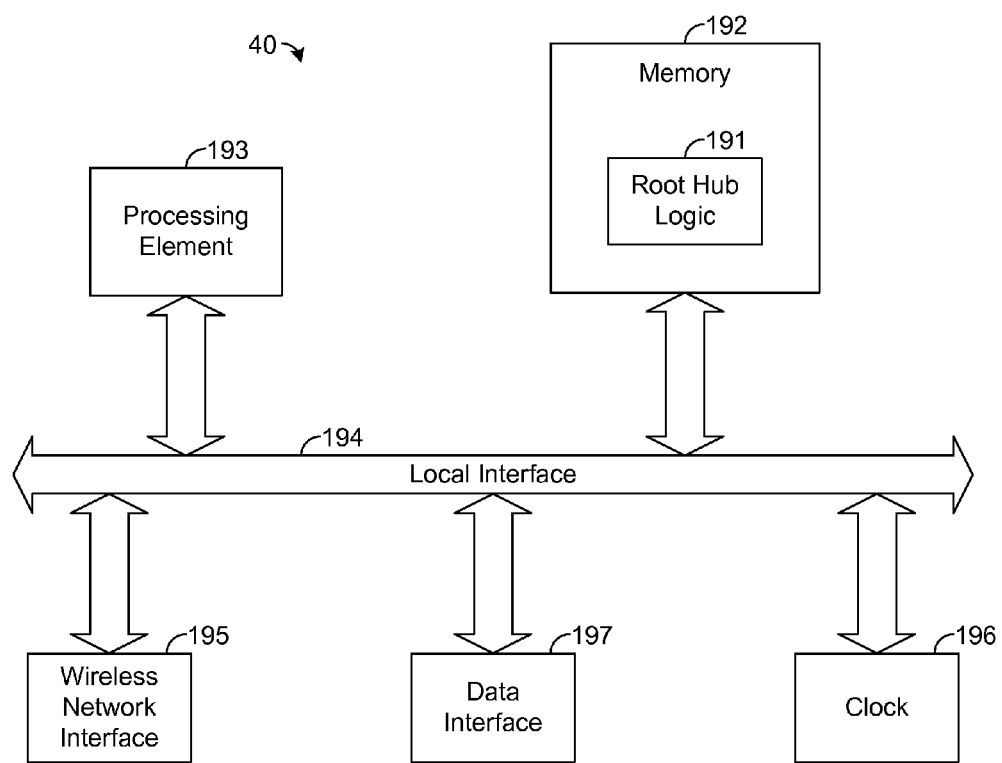
FIG. 7 is a block diagram illustrating an exemplary embodiment of a root hub, such as is depicted by FIG. 4.

FIG. 7 depicts an exemplary embodiment of the root hub 40. The architecture of the root hub 40 is similar to that of the other hubs 36-39. As shown by FIG. 7, the root hub 40 has root hub logic 191 for generally controlling the operation of the root hub 40. The root hub logic 191 can be implemented in software, hardware, firmware, or any combination thereof. In the exemplary embodiment illustrated in FIG. 7, the root hub logic 191 is implemented in software and stored in memory 192. The root hub logic 191, when implemented in software, can be stored and transported on any computer-readable medium for use by or in connection with an instruction execution apparatus that can fetch and execute instructions.

The exemplary embodiment of the root hub 40 depicted by FIG. 7 comprises at least one conventional processing element 193, such as a digital signal processor (DSP) or a central processing unit (CPU), that communicates to and drives the other elements within the hub 40 via a local interface 194, which can include at least one bus. The root hub 40 also comprises a wireless network interface 195 for enabling the root hub 40 to communicate with security tags 33 and/or other hubs 36-39. In one exemplary embodiment, the network interface 195 communicates RF signals but other types of signals may be communicated in other embodiments. The root hub 40 further comprises a clock 196. As described above, the clock 196 is synchronized with the clocks of the other hubs 36-39 and the server 35 of the system 25.

In one exemplary embodiment, the root hub 40 has a data interface 197, such as a universal serial bus (USB) port, coupled to the server 35. The root hub 40 serves as a gateway for the server 35 in the wireless network implemented by the hubs 36-40. However, in other embodiments, there may be more than one root hub 40, and it is unnecessary for the root hub 40 to be coupled to or serve as a gateway to the server 35. For example, the server 35 may communicate wirelessly with the root hub 40. Alternatively, one of the other hubs 36-39 may serve as a gateway for the server 35. Various other configurations of the system 25 would be apparent to one of ordinary skill in the art upon reading this disclosure.

Figure 8:
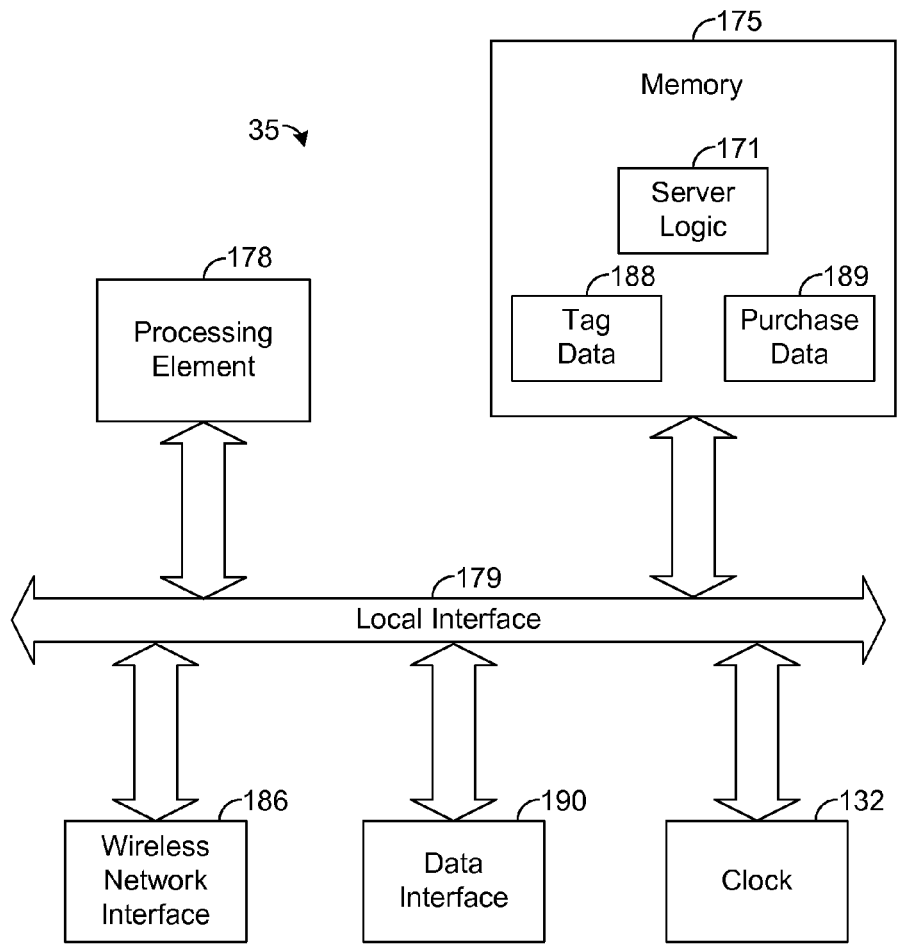
FIG. 8 is a block diagram illustrating an exemplary embodiment of a server, such as is depicted by FIG. 4.

FIG. 8 depicts an exemplary embodiment of the server 35. As shown by FIG. 6, the server 35 has server logic 171 for generally controlling the operation of the server 35. The server logic 171 can be implemented in software, hardware, firmware, or any combination thereof. In the exemplary embodiment illustrated in FIG. 8, the server logic 171 is implemented in software and stored in memory 175. The server logic 171, when implemented in software, can be stored and transported on any computer-readable medium for use by or in connection with an instruction execution apparatus that can fetch and execute instructions.

The exemplary embodiment of the server 35 depicted by FIG. 8 comprises at least one conventional processing element 178, such as a digital signal processor (DSP) or a central processing unit (CPU), that communicates to and drives the other elements within the server 35 via a local interface 179, which can include at least one bus. The server 35 also comprises a wireless network interface 186 for enabling the server 35 to communicate wirelessly with other devices. In one exemplary embodiment, the network interface 186 communicates RF signals but other types of signals may be communicated in other embodiments. The server 35 further comprises a clock 132 and a data interface 190. As described above, the clocks of the hubs 36-40 are synchronized to the clock 132. The data interface 190 is coupled to the data interface 197 of the root hub 40 via a conductive connection, such as a USB connection.

As shown by FIG. 8, data 188 from at least one security tag 33, referred to herein as "tag data," is stored in the memory 175. The tag data 188 is indicative of various information about the security tags 33 being monitored by the system 25. For example, in one exemplary embodiment, the tag data 188 includes identifiers, referred to hereafter as "tag identifiers," for the security tags 33. In this regard, each tag identifier identifies a respective one of the security tags 33. Correlated with each tag identifier in the tag data 188 is product information about the article 45 that is attached to the security tag 33 identified by the tag identifier. Also correlated with each tag identifier in the tag data 188 is information indicative of the location of the security tag 33 identified by the tag identifier. In one exemplary embodiment, the tag data 188 is stored in a database, although the tag data 188 may be stored in other types of memory devices in other embodiments.

The server 35 also stores data 189, referred to herein as "purchase data," indicative of articles 45 that have been purchased. As an example, the purchase data 189 may include the product data 71 in the tag data 188 correlated with purchased articles 45. The purchase data 189 may also include other information about the purchase, such as consumer information indicative of the consumer who purchased the article 45 and the method or time of payment.

Figure 9:
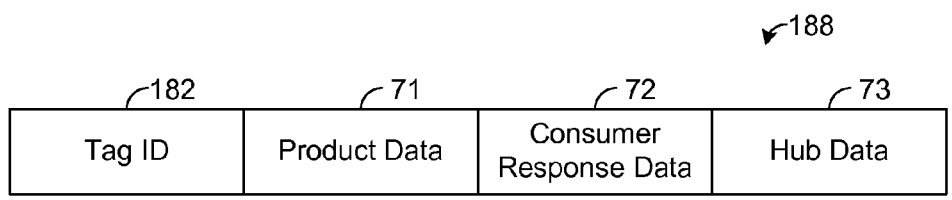
FIG. 9 depicts an exemplary entry of tag data, such as is depicted by FIG. 8.

FIG. 9 depicts an exemplary entry of a database that is storing the tag data 188 in one exemplary embodiment. The tag data 188 of FIG. 9 includes a tag identifier 182 that identifies a security tag 33. Stored in the same entry and thereby correlated with the tag identifier 182 are product data 71, consumer response data 72, and hub data 73 transmitted from and/or stored in the security tag 33 identified by the tag identifier 182. The product data 71 identifies the article 45 that is attached to such security tag 33, and the consumer response data 72 indicates how consumers have handled or otherwise responded to the article 45, as described above. Further, the hub data 73 identifies the hub 36-40 that is currently selected by the identified security tag 33 as its primary hub. Thus, the hub data 36-40 indicates the approximate location of the security tag 33.

The tag data 188 may be viewed and/or analyzed to determine the state of the articles 45 monitored by the system 25. For example, the tag data 188 represents an inventory of the articles 45 within the building 28. Thus, a user may consult the tag data 188 to determine which articles are presently in the building 28 and the location of each article 45 that is within the building. In some cases, articles 45 of a particular type may be displayed in a particular area of the building 28, but a consumer or employee may have moved the article 45 to another area. By consulting the tag data 188, articles 45 that have been misplaced can be identified and located. Having access to the tag data 188 may obviate the need of employees performing a manual inventory of the articles 45 within the building 28 thereby saving time and costs.

There are various techniques that can be used to access the tag data 188. In one exemplary embodiment, the wireless network interface 186 is used to transmit the tag data 188 to a device, such as lap-top or other type of computer, that then prints or otherwise displays the tag data 188. Alternatively, the server 35 may comprise a user interface, such as a display device or printer, that can be used to display the tag data 188. The server 35 be interfaced with a wide area network (WAN) that provides access to the tag data 188 via the WAN. As an example, the server 35 may host a web page accessible via the Internet and populate the web page with the tag data 188. Various other techniques may be used to access the tag data 188 in other embodiments.

In one exemplary embodiment, the tag data 188 is transmitted from the security tags 33 to the server 35 via the hubs 36-40. In this regard, as described above, each hub 36-40 is allocated a tag communication period in which the hub communicates with the security tags 33 that have selected it as their primary hub. During such tag communication periods, the security tags 33 may communicate portions of the tag data 188 to the hubs 36-40. Periodically, there is a communication period, referred to hereafter, as "server communication period" in which the hubs 36-40 communicate with the server 35. During such period, the hubs 36-40 transmit to the server 35 any tag data 188 received from the security tags 33 and not previously reported to the server 35. During the server communication period, the security tags 33 are quiet. That is, the security tags 33 do not attempt wireless communication in an effort to avoid data collisions with the messages being transmitted by the hubs 36-40. Note that the messages communicated between the hubs 36-40 and the server 35 may hop one or more hubs 36-40 before arriving at its destination.

In one exemplary embodiment, the communication periods for the system 25 are periodic in five second intervals, although intervals of other durations may be used. To better illustrate aspects of the present disclosure, an exemplary five second communication interval will now be described below.

In this regard, the server 35 transmits a synchronization signal that is routed through the system 25 to the other hubs 36-39. Transmission of such synchronization signal marks the beginning of the five second time period being described. Immediately following the synchronization signal is the server communication period, which has a duration of one second. During the server communication period, the hubs 36-40 may report tag data 188 previously received from the tags 33 if such data 188 has not yet been reported to the server 35. The server 35 may also transmit messages to the hubs 36-40, if desired.

At the conclusion of the server communication period, the tag communication periods begin and occur successively such that one tag communication period for a hub 36-40 does not overlap with a tag communication period for another hub 36-40. Four seconds after the end of the server communication period and, hence, the start of the first tag communication period, another synchronization signal is transmitted by the server 35 for the next five second interval. During such four second time period, a tag communication period for each hub 36-40 occurs. Thus, in the present example in which the interval for the tag communication periods is four seconds, the maximum number of tag communication periods is forty (40), assuming a 100 ms tag communication period for each hub 36-40. Such an embodiment allows forty (40) hubs 36-40 to operate while providing each hub 36-40 with a tag communication period once every five seconds.

As described above, each tag communication period has a duration of 100 ms. In addition, as described above, each tag communication period is associated with a respective one of the hubs 36-40 and this associated hub 36-40 is allowed to communicate with the security tags 33 that have selected it as their primary hub. For illustrative purposes, an exemplary sequence of events for one of the 100 ms tag communication periods will now be described in detail for one exemplary embodiment. For illustrative purposes, assume that the tag communication period being described is allocated for the hub 36.

At the start of the tag communication period, the hub 36 transmits a signal, referred to as a "hub broadcast signal," that includes an identifier, referred to as "hub identifier," identifying the transmitting hub 36. In one exemplary embodiment, the hub broadcast signal also includes a type identifier indicating whether the transmitting hub 36 is a system hub, a gate hub, or a root hub. The hub broadcast signal is not retransmitted by the other hubs 37-40 so that only the security tags 33 within range of the hub 36 hear the hub broadcast signal. Following transmission of the hub broadcast signal, the security tags 33 that have selected the hub 36 as their primary hub may communicate with the hub 36. All other security tags 33 remain quiet in an effort to avoid data collisions with the tags 33 that are communicating with the hub 36.

In an effort to conserve battery power for the security tags 33 and to reduce messaging, the communication between a tag 33 and its primary hub is limited. In this regard, each tag 33 that has selected the hub 36 as its primary hub does not necessarily communicate during each tag communication period allocated to the hub 36. In one exemplary embodiment, a security tag 33 reports updates to the tag data 188 that have yet to be reported by the tag 33 so that the tag data 188 at the server 35 is updated. In one exemplary embodiment, a security tag 33 reports following events described below.

In this regard, during the tag communication period, a security tag 33 reports to the hub 36 if the security tag 33 has newly selected the hub 36 as its primary hub or if the hub data 73 has otherwise been newly updated. Note that newly updated generally refers to an update that has not previously been reported to the server 35 such that the tag data 188 at the server 35 does not reflect the update. As an example, assume that a tag 33 has selected the hub 37 as its primary hub. Previously, the tag 33 would have reported, via the hub 37, that this hub 37 has been selected by the tag 33 as its primary hub. The hub 37 would have transmitted this information to the server 35, which would have updated the tag data 188 to indicate such selection. As an example, the server 35 may correlate the tag's identifier 182 with the hub identifier of the hub 37.

However, assume that the tag 33 is moved away from the hub 37 and closer to the hub 36. In such an example, the signal strength of the hub broadcast signal from the hub 37 may fall below a specified threshold such that the tag 33 begins searching for a new primary hub. If the highest strength hub broadcast signal heard by the tag 33 is from the hub 36, which is different than the hub 37 previously selected by the tag 33, then the tag 33 selects the hub 36 as its primary hub. Since the primary hub for the tag 33 has now changed, the tag 33 transmits a message indicative of this change to the hub 36 during the tag communication period allocated to the hub 36. In one exemplary embodiment, the message includes the hub identifier of the hub 36 and the tag identifier 182 of the tag 33 transmitting the message.

Upon receiving the message, the hub 36 stores the message until the next server communication period and then attempts to forward the message to the server 35. Upon receiving such message, the server 35 updates the tag data 188 to indicate the change in selection of the primary hub for the tag 33. That is, the server logic 171 (FIG. 8) replaces the hub identifier of the hub 37 with that of the hub 36 in the entry for the tag identifier 182 of the tag 33. Thus, by analyzing the tag data 188, it can be determined that the tag 33 has now moved into the coverage area 86 of the hub 36. Once the selection of the hub 36 has been reported to the server 35, there is no need for the security tag 33 to report its primary hub until the selection of its primary hub changes.

During the tag communication period, a security tag 33 also reports to the hub 36 if the consumer response data 72 has been newly updated. For example, if the handling count is incremented due to a consumer picking up or otherwise handling the article 45 attached to the security tag 33, then the security tag 33 transmits to the hub 36 a message indicative of the updated handling count and/or other information associated with the update, such as the time of handling or other information. In one exemplary embodiment, the message indicates the update for the consumer response data 72 and includes the tag identifier 182 of the security tag 33 transmitting the message.

Upon receiving the message, the hub 36 stores the message until the next server communication period and then attempts to forward the message to the server 35. Upon receiving such message, the server 35 updates the tag data 188 to indicate the change to the consumer handling data 72. That is, the server logic 171 (FIG. 8) updates the consumer handling data 72 correlated with the tag identifier 182 identifying the tag 33 that submitted the update.

In one exemplary embodiment, each message transmitted from the tag 33 includes at least the following: the tag identifier of the transmitting tag, the hub identifier of the transmitting tag's primary hub, the consumer response data 72 (such as handling count), and a voltage indicator that is indicative of the current voltage of the tag's battery. The server 35 may be configured to take some action based on the voltage indicator. For example, if the voltage indicator indicates that the voltage of the tag's battery has fallen below a threshold thereby indicating that the battery should be replaced, the server 35 is configured to provide a user output, such as a displayed message or an email message, to prompt a user to replace the tag's battery. The voltage indicator may be stored in the tag data 188 and correlated with the tag's identifier 182 and available for viewing along with the other data correlated with the tag's identifier 182.

The product data 71 is initially established during a process, referred to hereafter as a "commissioning process," for the tag 33. An exemplary commissioning process will now be described below.

Initially, before the tag 33 is attached to an article 45 and commissioned, the tag 33 is in a state, referred to herein as a "decommissioned" state. While in the decommissioned state, the tag 33 selects a primary hub and sends messages to the server 35 so that the tag data 188 identifies the tag 33 and correlates the tag's identifier 182 with hub data 73 indicative of the tag's primary hub and, hence, approximate location, as described above. However, the tag logic 52 disables the motion logic 53 and/or puts the motion sensor 54 to sleep. Thus, the tag 33 refrains from sending any messages based on the motion sensor 54 while in the decommissioned state.

When the tag 33 is to be commissioned for the monitoring of an article 45 of merchandise, a store employee or other user couples the tag 33 to the article 45. The locking mechanism 48 may be actuated, mechanically or electrically, such that the employee or other user locks the article 45 to the security tag 33. In addition, a scanner (not shown) is used to scan product information, such as the article's SKU code, from a label of the article 45 and to communicate the product information to the server 35. In one exemplary embodiment, a scanner is coupled to the server 35 and communicates directly with the server 35. However, other configurations are possible. For example, a mobile scanner may be used to scan the product information and to communicate the product information to the server 35 via at least one hub 36-40 or otherwise. Alternatively, product information may be manually entered via a user input device, such as a keypad or keyboard, that is communicatively coupled to the server 35. In yet other embodiments, other techniques for providing product information to the server 35 are possible.

The server logic 171 is configured to correlate the received product information with the tag identifier 182 of the tag 33 that is being commissioned for the article 45 (i.e., that is being coupled to the article 45 during the commissioning process). In particular, the server logic 171 stores the received product information as the product data 71 that is correlated with the tag identifier 182 identifying the tag 33.

Note that there are various techniques that can be used to enable the server logic 171 to find the appropriate tag identifier 182 for the tag 33 being commissioned. For example, an input identifying the tag 33 to be commissioned may be received by the server 35. In one exemplary embodiment, the identification of the tag 33 being commissioned is automatically determined based on the proximity of the tag 33 to the root hub 40 or other factor. In this regard, as indicated above, the hub broadcast signal transmitted by each hub 36-40 identifies the transmitting hub and indicates the hub type of the transmitting hub. Thus, when a tag 33 selects the root hub 40 as its primary hub, it is aware that the selected hub is a root hub. Root hubs differ from the system hubs 36-38 in that a root hub is used to commission tags 33. Indeed, in one exemplary embodiment, a tag 33 is commissioned by moving the tag 33 to within a specified distance of a root hub 40, such as a few feet, and then scanning the label of the article 45 that is coupled to the tag 33 or that is to be coupled to the tag 33. The tag 33 and the root hub 40 can determine when the tag 33 is within the specified distance based on the received signal strengths of the messages communicated between the tag 33 and the root hub 40. In this regard, if the signal strength of a received message is above a specified threshold, then it is determined that the tag 33 is within the specified range of the root hub 40.

When the tag 33 is within the specified range, the root hub 40 transmits to the server 35 a message that includes the tag identifier 182 of such tag 33. Thus, the server 35 is aware of which tag 33 is within the specified distance when the product information from the scanned label of the article 45 is received by the server 35. The server logic 171 can then correlate the product information with the tag identifier 182 of the appropriate tag 33, as described above.

After receiving the product information during the commissioning process, the server logic 171 also transmits a command, referred to hereafter as a "commissioning command," to the security tag 33. The commissioning command includes the tag identifier 182 identifying the tag 33 being commissioned (i.e., the tag that is coupled to the article 45). The commissioning command may be transmitted from the server 35 to the tag's primary hub during a server communication period, and such command may be transmitted from the tag's primary hub to the tag 33 during the appropriate tag communication period.

In one exemplary embodiment, the commissioning command includes the product data 71 so that this data 71 may be stored in the tag 33. However, as described above, the product data 71 is stored and accessible at the server 35. By storing the product data 71 at the tag 33, it is possible to include the product data 71 in the messages transmitted from the tag 33 so that the server logic 171 can confirm consistency between the message and the tag data 188 correlated with the message's tag identifier. However, such confirmation and storage of the product data 71 in the tag 33 are unnecessary.

In response to the commissioning command, the tag logic 52 awakens the motion logic 53 and the motion sensor 54. Thereafter, the tag logic 52 initializes the consumer response data 72 (e.g., resets the handling count) and beings operating normally, as described above. In particular, the tag logic 52 tracks when the article 45 is handled based on the motion logic 53 and the motion sensor 54 and reports updates to the consumer response data 72. Also, the tag logic 52 maintains and updates the hub data 73 as appropriate.

At some point, a consumer may decide to purchase the article 45 and take the article 45 to an employee for purchase. The employee effectuates the sale using a cash register or some other device. Once the purchase has been confirmed, a message, referred to hereafter as a "purchase message," is sent to the server 35 indicative of the sale. In one exemplary embodiment, the purchase message is communicated from the machine, such as the cash register or card reader (e.g., credit or debit), that is used to effectuate the purchase. Once confirmation has been received that the financial transaction for making the purchase is complete (e.g., upon receiving confirmation from a financial network, such as the Automated Clearing House (ACH)), a purchase message is automatically transmitted from such machine to a hub 36-40, which forwards the message to the server 35. Note that the message may include consumer information, such as the consumer's name, address, or method of payment. In other embodiments, other techniques for informing the server 35 of the sale are possible.

Upon receiving the purchase message, the server 35 disassociates the product data 71 and the consumer response data 72 from the tag identifier 182 in the tag data 188 so that the tag identifier can be later associated with another article of merchandise. For example, the server logic 171 may move the product data 71 to another area of memory 175 where information about purchased products is stored. As an example, the server logic 171 may move the product data 71 and consumer response data 72 from the tag data 188 to the purchase data 189 and correlate the information about the purchasing consumer in the purchase data 189 with the product data 71 and consumer response data 72. Thus, the purchase data 189 can be later analyzed to identify the purchased article 45, to determine information about the consumer who purchased the article 45, and to determine how the article 45 was handled by consumers prior to purchase.

In addition, the tag data 188 indicates that the tag 33 is currently decommissioned and, thus, is no longer coupled to an unpurchased article 45 of merchandise being monitored by the system 25. The tag data 188 continues to indicate this state of the tag 33 until the tag 33 is later commissioned for another article 45. Moreover, the commissioning and decommissioning processes update the tag data 188 such that it accurately reflects in real-time the inventory of articles 45 being monitored by the system 25.

In response to the purchase message, the server logic 171 also transmits a command, referred to hereafter as "decommissioning command," to the tag 33 that is coupled to the purchased article 45. The decommissioning command includes the tag identifier 182 identifying such tag 33. The decommissioning command may be transmitted from the server 35 to the tag's primary hub during a server communication period, and such command may be transmitted from the tag's primary hub to the tag 33 during the appropriate tag communication period.

In response to the decommissioning command, the tag 33 transitions to the decommissioned state. That is, the tag logic 52 puts the motion logic 73 and the motion sensor 54 to sleep. The tag logic 52 also deletes the product data 71 from memory 55. In addition, the tag logic 52 transitions the locking mechanism 48 from a locked state to an unlocked state thereby enabling the locking mechanism 48 to be separated from the article 45 that has been purchased. In this regard, the tag logic 52 transmits a control signal that causes the locking mechanism 48 to unlock. Accordingly, the article 45 is not unlocked from the tag 33 until the server 35 has received confirmation of purchase. Since the locking mechanism 48 is configured to remain locked until a decommissioned command is received by the tag 33, it can be ensured that the article 45 that has purchased is, in fact, the one that is being unlocked. In addition, such a feature may help to frustrate efforts by a thief who tries to mechanically actuate the locking mechanism 48 without purchasing the article 45.

In one exemplary embodiment, the tag 33 is configured to transition to a sleep state at various times in an effort to conserve battery power and prolong the useful life of a battery (not shown) used to power the components of the tag 33. In this regard, as described above, the tag logic 52 is configured to select one of the hubs 36-40 as its primary hub depending on its location within the building 28 and the quality of communication with the respective hubs 36-40. Further, each hub 36-40 is allocated a tag communication period that is of a predefined duration and occurs periodically or otherwise at predefined times. For the purposes of illustration, assume that the tag communication periods of the tag's primary hub occur every five seconds and have a duration of 100 ms, as described above for one exemplary embodiment.

In general, the hub logic 52 is configured to put to sleep various components of the tag 33 between the tag communication periods of its primary hub and awaken such components such that the tag 33 is ready and able to communicate during selected tag communication periods. For example, in one exemplary embodiment, the tag 33 has clock monitoring logic 201 (FIG. 3) that is configured to monitor the tag's clock 65. In one embodiment, the clock monitoring logic 201 is implemented in hardware, but such logic 201 may be implemented in software, hardware, firmware, or any combination thereof in other embodiments. As will be described in more detail hereafter, the clock monitoring logic 201 is configured to awaken the tag 33 at preselected times under the direction and control of the tag logic 52.

In this regard, at the conclusion of a tag communication period, the tag logic 52 puts to sleep various components of the tag 33, such as the wireless network interface 66 and the processing element 58, and other non-essential components. As part of this process, the tag logic 52 may also transition to a sleep state. If the tag 33 is in the commissioned state, however, the motion logic 53 and motion sensor 54 remain awake to enable detection of movement of the tag 33, which may be indicative of movement of the article 45 by a consumer or other user. Before putting the components of the tag 33 to sleep, the tag logic 52 schedules an awakening with the clock monitoring logic 201 for just prior to the beginning of the next tag communication period in which the tag 33 is to report to the server 35.

While the components of the tag 33 are asleep, the clock monitoring logic 201 monitors the clock 65 to determine when the scheduled awakening time is reached. When this time is reached, the clock monitoring logic 201 initiates an awakening of the tag 33 such that the components previously put to sleep are awakened. Thus, the scheduling is performed such that the tag 33 is awakened just prior to the start of a tag communication period allocated to its primary hub such that the tag 33 is ready to communicate with its primary hub at the beginning of such tag communication period.

In one exemplary embodiment, the tag 33 is configured to schedule awakenings periodically to report to the server 35 but not necessarily every tag communication period for its primary hub. For example, the tag communication periods for its primary hub may occur every five seconds, as described above, and the tag 33 may be configured to automatically report every hour (or at some other frequency) regardless of whether any motion is sensed by the motion sensor 54. Thus, in the absence of motion, the tag 33 awakens for one tag communication per hour (or for some other number of tag communication periods) and reports to the server 35. As described above, the reported message may include the tag identifier, the hub identifier of the tag's primary hub, the handling count, the voltage of the tag's battery, and/or other information about the tag 33. During the course of one hour in such an example, the tag 33 is awake for about 100 ms (i.e., during one tag communication period) and is asleep for the remainder of the hour, assuming that a handling occurrence is not sensed.

As described above, at the start of a tag communication period allocated to the tag's primary hub, such hub transmits a hub broadcast signal. The tag logic 152 is configured to synchronize to this hub broadcast signal such that the timing of the next awakening of the tag 33 is precisely controlled to occur a predefined amount of time, such as just under one hour, from the reception of the hub broadcast signal. As an example, based on the hub broadcast signal, the tag logic 52 may update its clock 65 such that it is synchronized to the clock of its primary hub. In addition, as described above, the clock of its primary hub is synchronized to the clock of the server 35 and is therefore synchronized with the global timing domain of the system 25. Thus, since the timing of the tag 33 is synchronized to the hub broadcast signal, the timing of the tag 33 remains synchronized with the global timing domain as well.

If the motion logic 53 detects an occurrence of a handling event based on the motion sensor 54 while the tag 33 is asleep, as described above, and while the tag 33 is in the commissioned state, the motion logic 54 awakens the necessary components to appropriately update the consumer response data 72. For example, the motion logic 53 may awaken the processing element 58 and the tag logic 72 and then inform the tag logic 52 of the occurrence of the handling event. In response, the tag logic 52 updates the consumer response data 72.

In addition, tag logic 52 also communicates with the clock monitoring logic 201 to schedule an awakening for the next tag communication period allocated to its primary hub in order to check the signal strength of its primary hub and/or to report the handling event to the server 35. In this regard, the sensed motion may indicate that the location of the tag 33 is being changed such that it may not be desirable to wait an extended period of time before checking the signal strength of its primary hub or otherwise check the location of the tag 33. For example, if the tag 33 movement of the tag 33 is bringing the tag 33 close to the gate hub 39, it would be desirable for the tag 33 to quickly discover this so that the tag 33 will not miss the opportunity to transition to an alert mode, as will be described hereafter, and/or trigger an alarm.

Thus, when a handling event is detected, the tag 33 temporarily awakens in order to update the handling count and to schedule an awakening for the next tag communication period allocated to its primary hub. Once the consumer response data 72 is updated and an awakening is scheduled for the next tag communication period, the awakened components are transitioned back to a sleep state.

Accordingly, once the tag 33 has selected a primary hub, the tag 33 is put to sleep and is temporarily awakened for the tag communication periods allocated to its primary hub and in response to detections of handling events. Otherwise, the tag 33 generally remains in a sleep state. Each time it is awakened for a given tag communication period, it determines the signal strength of the hub broadcast signal that is transmitted from its primary hub at the start of the tag communication period.

If the signal strength of the hub broadcast signal falls below a specified threshold, such as may be the case when the tag 33 is moved away from the primary hub, then the tag logic 52 is configured to initiate a selection process for selecting a new primary hub.

In this regard, rather than transitioning to a sleep state at the conclusion of the tag communication period in which the tag logic 52 determines to initiate the selection process, the tag logic 52 does not put the tag 33 to sleep, as is described above. Instead, the tag 33 remains awake to hear the hub broadcast signals of other hubs and to compare the signal strengths of these signals. For example, by listening for hub broadcast signals for five seconds in the current embodiment in which such signals occur every five seconds, it can be ensured that tag 33 hears each hub broadcast signal from a hub 36-40 that is in range of the tag 33. At the conclusion of the five second time period, the tag logic 52 selects the hub 36-40 that transmitted the highest strength signal. The tag logic 52 also schedules with the clock monitoring logic 201 an awakening to occur just before the next tag communication period allocated to this newly selected primary hub and then transitions the tag 33 to a sleep state.

After selecting the new primary hub, the tag 33 attempts to report this new primary hub selection to the server 35 during the next tag communication period allocated to the new primary hub. If the tag 33 tries but is unable to successfully report a message, such as a notice of a new primary hub selection, during a tag communication period, then the tag 33 wakes up for the next successive tag communication period and retries the reporting. The tag 33 continues attempting a retry in successive tag communication periods until the reporting is successful. Thus, at some point, the tag data 188 at the server 35 is updated for the event being reported. In the instant case, the tag data 188 is updated to indicate that the tag logic 52 has selected a new primary hub and the identifier of this newly selected primary hub is correlated with the tag's identifier 182 in the tag data 188.

By transitioning the tag 33 into and out of sleep states, as described above, the tag 33 is able to remain in sleep states for significant periods of time while enabling the tag data 188 at the server 25 to be updated in real-time, as appropriate. Further, the architecture of the system 25 helps to reduce the amount of messaging that is implemented in order to keep the tag data 188 updated and helps to avoid data collisions, which may be particularly problematic as the number of tags 33 being monitored increases and/or during periods of frequent movement of the tags 33, such as holiday shopping when the building 28 is filled with a large number of consumers.

As described above, each hub 36-40 from time-to-time transmits a hub broadcast signal that includes data identifying the transmitting hub and the transmitting hub's type. Based on the type data, a security tag 33 determines whether the transmitting hub is a system hub 36-38, a gate hub 39, or a root hub 40. The tag logic 52 of the security tag 33 may behave differently depending on which type of hub it has selected as its primary hub. For example, if the tag logic 52 of a security tag 33 selects a root hub 40 as its primary hub, then the tag logic 52 may monitor its distance from the root hub 40, based on signal strength as described above or otherwise, in order to initiate or perform other actions for the commissioning process.

Also, if the tag logic 52 selects a gate hub 39 as its primary hub, then the tag logic 52 may take actions for triggering an alarm. In this regard, selection of the gate hub 39 indicates that the tag 33 is in close proximity of the gate hub 39 such that a user may be attempting to carry the article 45 out of the building 28 without having the tag 33 properly decommissioned (e.g., without purchasing the article 45). Thus, it may be desirable to trigger an alarm depending on the tag's proximity to the gate hub 39.

In one exemplary embodiment, when the tag logic 52 selects the gate hub 39 as its primary hub, the tag logic 52 begins monitoring its distance from the gate hub 39 based on the signal strength of the hub broadcast signal transmitted by the gate hub 39 or otherwise. When the signal strength of this signal exceeds a specified threshold, the tag logic 52 transitions into an alert mode, which will be described in more detail below. Similarly, the gate hub 39 also transitions into an alert mode.

Note that the gate hub logic 151 may determine when to transition to the alert mode based on the signal strength of a signal received from the tag 33. In this regard, if the signal strength exceeds a specified threshold, the gate hub logic 151 transitions to the alert mode. Alternatively, either the tag 33 or the gate hub 39 may determine when to transition to the alert mode and instruct the other device to so transition. In addition, if location coordinates are calculated to determine the location of the tag 33, the decision about when to transition to the alert mode may be based on a comparison of such coordinates to a predefined boundary or other data rather than a comparison of signal strength. Various other techniques for determining when to transition to the alert mode are possible in other embodiments.

When in the alert mode, the tag 33 sleeps less, if at all, and the gate hub 39 transmits its hub broadcast signal at a rate faster than normal. Thus, in the instant embodiment in which the hub broadcast signal is normally transmitted every five seconds, the gate hub logic 151 transmits more frequently (e.g., once per second or once per 2.5 seconds). Further, the tag 33 remains awake during the alert mode or awakens more frequently such that it can hear each hub broadcast signal transmitted by the gate hub 39. Increasing the frequency of the communication of the hub broadcast signal in the alert mode generally increases the responsive of the system 25 to position changes of the tag 33 when it is close to the gate hub 39. As an example, a thief may be running through the exit 49 such that the position of the tag 33 is changing quickly.

Once the signal strength of the hub broadcast signal exceeds a specified threshold, which is higher than the threshold for determining when to enter the alert mode, the tag logic 52 triggers an alarm. In this regard, the tag logic 52 activates the speaker 63 and/or the light source 64 to convey an alarm. If the speaker 63 is activated, an audible alarm (e.g., beeps and/or a pre-recorded message) is generated. If the light source 64 is activated, a visual alarm (e.g., blinking lights) is generated. The tag logic 52 may also transmit a message to the gate hub 39 indicating the alarm condition.

The gate hub 39 is similarly configured to generate an alarm. In this regard, the gate hub logic 151 may be configured to trigger an alarm when the signal strength of a signal from the tag 33 exceeds a specified threshold, similar to the tag 33 described above. Alternatively, the decision to trigger an alarm could be based on some other factor, such as a message from the tag 33 indicating that the tag 33 has sensed an alarm condition. Further, the gate hub 39 could sense the alarm condition and inform the tag 33 to trigger an alarm at the tag 33. In addition, alarms at either the tag 33 or gate hub 35 may be triggered via other techniques such as based on calculated coordinate values of the tag 33. Further, the gate hub logic 151 may be configured to transmit an alarm message to the server 35 or other destination to alert a user of the alarm condition. As an example, an email message may be generated at the server 35 and transmitted to a user. Various other actions in response to a detection of an alarm condition are possible.

In an alarm condition, the gate hub logic 151 triggers an alarm. In this regard, the gate hub logic 151 activates the speaker 153 and/or the light source 154 to convey an alarm. If the speaker 153 is activated, an audible alarm (e.g., beeps and/or a pre-recorded message) is generated. If the light source 154 is activated, a visual alarm (e.g., blinking lights) is generated. Accordingly, once the tag 33 is within a certain proximity of the gate hub 39, alarms at both the gate hub 39 and the tag 33 are generated.

In one exemplary embodiment, additional hubs are located outside of the building 28 or other predefined area guarded by the gate hub 39 so that the tag 33 can continue to be tracked once it has exited the building 28 or other predefined area.

Note that alarms may be generated at times regardless of the tag's proximity from the gate hub 39. As an example, as described above, the tag 33 is configured to awaken during the tag communication period allocated to its primary hub. If the tag 33 fails to hear the hub broadcast signal of its primary hub during this period, then the tag logic 52 is configured to generate an alarm, such as activating the speaker 63 and/or light source 64. In such a condition, it is possible that a thief or other user has disabled wireless communication of the tag 33, such as by damaging the tag 33 or covering the tag 33 with a material, such as aluminum foil, that blocks the wireless signals communicated by the tag 33.

Now, therefore, the following is claimed:

1. A tag security system, comprising:
a security tag attached to an article of merchandise;
a plurality of hubs operable to wirelessly communicate with the security tag, at least one of the hubs operable to provide an alarm when the security tag is moved to a predefined area, wherein the tag is operable to select one of the hubs as its primary hub based on a signal strength of a signal received from the selected hub, and wherein each of the hubs is allocated tag communication periods for communicating with security tags according to a time-division multiplexed algorithm such that tag communication periods allocated to the selected hub are non-overlapping with respect to tag communication periods allocated to other hubs of the system;
memory external to the security tag for storing product data indicative of the article of merchandise; and
logic operable to determine a location of the security tag based on wireless communication between the selected hub and the security tag, the logic further operable to store, in the memory, location data indicative of the determined location of the security tag and to correlate in the memory the location data and the product data, wherein the security tag is operable to transition to a sleep state and to schedule an awakening from the sleep state, based on a timing of one of the tag communication periods allocated to the selected hub, for communicating during the one tag communication period.

2. The system of claim 1, wherein the logic is operable to correlate a tag identifier with the product data in the memory, the tag identifier identifying the security tag.

3. The system of claim 1, wherein the security tag is operable to automatically unlock from the article of merchandise in response to a message confirming purchase of the article of merchandise.

4. The system of claim 1, wherein the security tag is operable to sense movement of the security tag.

5. The system of claim 4, wherein the security tag is operable to wirelessly transmit data indicative of the sensed movement to at least one of the hubs.

6. The system of claim 5, wherein the logic is operable to correlate the product data with information indicating how often consumers have handled the article of merchandise based on the data indicative of the sensed movement.

7. A method, comprising the steps of:
attaching a security tag to an article of merchandise for purchase within a store;
communicating wireless signals between the security tag and a plurality of hubs positioned within the store;
allocating tag communication periods to each of the hubs according to a time-division multiplexed algorithm such that tag communication periods allocated to at least one of the hubs are non-overlapping with respect to tag communication periods allocated to other hubs of the plurality of hubs, wherein the one hub is permitted to communicate with security tags during tag communication periods allocated to the one hub;
wirelessly tracking the security tag based on the communicating step;
providing, based on the tracking step, an alarm when the security tag is moved to a predefined area of the store;
storing, in memory external to the security tag, product data indicative of the article of merchandise;
determining a location of the security tag based on the tracking step;
storing, in the memory, location data indicative of the determined location;
correlating the location data with the product data in the memory;
receiving, at the security tag, a signal from the one hub;
measuring a signal strength of the signal from the one hub;
selecting the one hub for communication with the security tag based on the measured signal strength;
transmitting the location data from the security tag to the one hub based on the selecting step;
transitioning the security tag to a sleep state; and
scheduling an awakening from the sleep state based on a timing of one of the tag communication periods allocated to the one hub.

8. The method of claim 7, further comprising the step of taking an inventory of products in the store based on the correlating step.

9. The method of claim 7, further comprising the step of correlating a tag identifier with the product data in the memory, wherein the tag identifier identifies the security tag.

10. The method of claim 7, further comprising the step of preventing at least one hub within the store from communicating with security tags based on the allocating step.

11. The method of claim 7, further comprising the step of sensing, by the security tag, when a consumer handles the article of merchandise.

12. The method of claim 11, further comprising the step of wirelessly transmitting data from the security tag based on the sensing step.

13. The method of claim 12, further comprising the step of correlating the product data with information indicative of how often consumers have handled the article of merchandise based on the data wirelessly transmitted from the security tag based on the sensing step.

14. The method of claim 7, further comprising the steps of:
receiving, at the security tag, a message confirming purchase of the article of merchandise; and
automatically unlocking the security tag from the article of merchandise based on the received message.

15. The method of claim 11, further comprising the step of counting a number of times that consumers handle the article of merchandise based on the sensing step.

16. The system of claim 2, wherein the logic is operable to remove a correlation between the product data and the tag identifier in the memory in response to a sale of the article of merchandise.

17. The system of 4, wherein the security tag is operable to count a number of times that the security tag is moved and to transmit data indicative of the number to the logic.

18. The system of claim 6, wherein the security tag comprises a sensor for sensing vibrations or tilt of the security tag, and wherein the security tag is operable to sense the movement based on the sensor.

19. The method of claim 13, wherein the sensing step comprises the step of sensing vibrations or tilt of the security tag.

20. The method of claim 7, further comprising the steps of:
sensing, by the security tag, handling events indicating that the article of merchandise is being handled by a respective user; and
tracking a number of the handling events detected by the security tag over time.

21. The method of claim 7, further comprising the steps of:
determining a second location of the security tag based on the communicating step; and
correlating, in the memory, the product data and a tag identifier identifying the security tag based on the determining the second location.

22. The method of claim 7, further comprising the step of sensing movement of the security tag, wherein the scheduling step is based on the sensing step.

23. The system of claim 1, wherein the security tag is operable to sense handling events indicating that the article of merchandise is being handled by a respective user, and wherein the logic is operable to track a number of the handling events detected by the security tag over time.

24. The system of claim 1, wherein the logic is operable to determine a second location of the security tag based on wireless communication between the security tag and at least one of the hubs, and wherein the logic is operable to correlate in the memory the product data and a tag identifier identifying the security tag based on the second location.

25. The system of claim 1, wherein the security tag is operable to sense movement of the security tag, and wherein the security tag is operable to schedule the awakening based on the sensed movement.

* * * * *